United States Patent [19]

Williford

[11] 3,826,999

[45] July 30, 1974

[54] FSK OSCILLATOR

[75] Inventor: Jerry G. Williford, Tustin, Calif.

[73] Assignee: Collins Radio Company, Dallas, Tex.

[22] Filed: Apr. 18, 1973

[21] Appl. No.: 352,368

[52] U.S. Cl. .......... 331/108 R, 328/127, 331/135, 331/179, 332/16 T

[51] Int. Cl. .......... H03b 5/24

[58] Field of Search .......... 331/136, 135, 108, 179; 328/127; 332/16 T, 16 R

[56] References Cited

UNITED STATES PATENTS 3,396,347 8/1968 Richman et al. .......... 331/136

OTHER PUBLICATIONS

"Active Filters" Girling et al., Wireless World, March 1970, Pgs. 134–139.

*Primary Examiner*—John Kominski

[57] ABSTRACT

An oscillator using two integrators interconnected with means for completing a 360° phase reversal from input to output whereby oscillations occur and are maintained. One embodiment changes the frequency at which the 360+phase reversal is completed for producing an FSK oscillator with a phase continuous output and another embodiment alters the point in the circuit at which the completion of 360° phase reversal occurs to produce a "reversible" oscillator having a phase continuous output.

3 Claims, 2 Drawing Figures

FSK OSCILLATOR

THE INVENTION

The present invention is directed to electronics and more specifically to oscillators. Even more specifically, the inventive concept is related to oscillators using two integrators for performing 90° phase shifts and a phase reversing device for providing the complete 360° phase reversal needed to be added to the loop for sustained oscillation of the circuit. (In a practical case, the integrators provide somewhat less than 90° of phase shift and the remainder is made up in the inverting amplifier.)

BACKGROUND OF THE INVENTION

The basic conditions required for a circuit to oscillate are, a closed loop around which the phase shift is $2\pi N$ radians (when N is an integer) and the gain, at the frequency at which the required phase shift is achieved, is unity.

Although many types of oscillators have been produced in the past, it is believed that this is the first in which the phase criteria is met over a wide frequency range, using integrators, and an inverting amplifier while the gain (which is frequency dependent) is chosen to meet the necessary criteria at the desired frequency of oscillation. This greatly simplifies the problem of rapidly shifting frequencies such as is done in FSK data systems.

In one embodiment, the gain is altered by means of a switch, so that either of two frequencies may be produced.

On another embodiment, the gain is held constant while the position of the inverting amplifier relative to the integrators is switched. This results in a constant frequency, however, the phase vector direction of rotation is reversed. This oscillator may be thought of as producing "positive" or "negative" frequencies.

It is therefore an object of the invention to provide improved oscillator apparatus. Other objects and advantages of the present invention may be ascertained from a reading of the specification and appended claims in conjunction with the drawings wherein FIG. 1 is a preferred embodiment of a frequency shift-keyed oscillator; and FIG. 2 is a preferred embodiment of a reversible oscillator.

DETAILED DESCRIPTION

Figure 1:
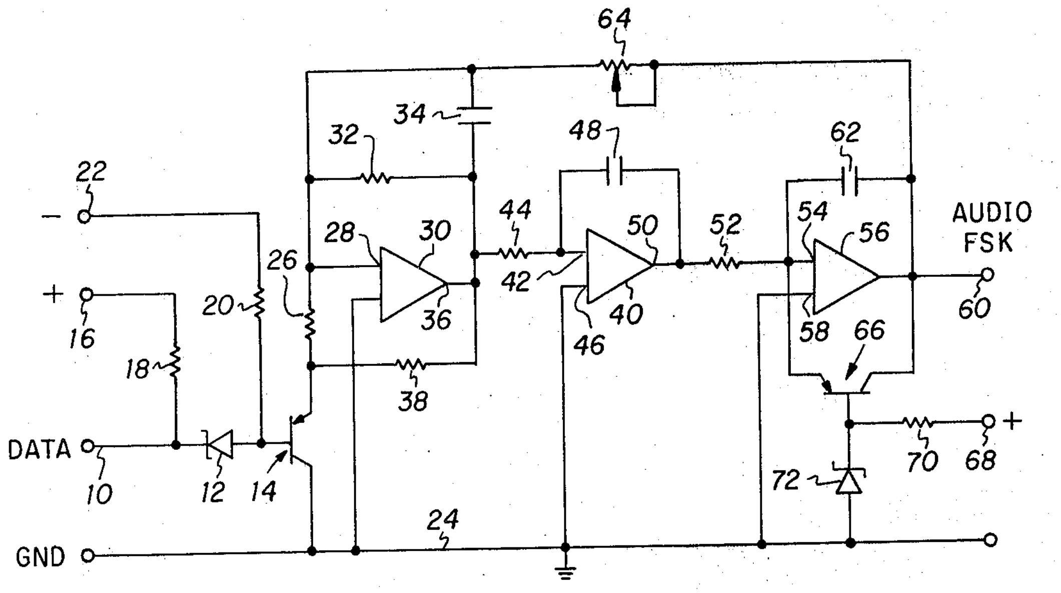

In FIG. 1 an input terminal 10 supplies signals through a zener diode 12 to a base of a PNP transistor generally designated as 14. A positive power terminal 16 supplies power through a resistor 18 to input 10. Current also flows from the base of transistor 14 through a resistor 20 to a negative power terminal 22. A collector of transistor 14 is connected to ground 24. The emitter of transistor 14 is connected through a resistor 26 to a negative or inverting input 28 of a differential amplifier generally designated as 30. A positive input of amplifier 30 is connected to ground 24. A feedback resistor 32 is connected in parallel with a capacitor 34 between an output 36 of amplifier 30 and input 28. A resistor 38 is connected between output 36 and the emitter of transistor 14. As will be determined later, the resistor 32 is a feedback resistor and the resistors 26 and 38 operate in parallel with resistor 32 and also with capacitor 34 when switch 14 is deactivated. When it is activated the feedback action of resistors 26 and 38 are eliminated. A differential amplifier 40 has an inverting input 42 connected through a resistor 44 to output 36 of amplifier 30. A non-inverting input 46 of amplifier 40 is connected to ground 24. A feedback capacitor 48 is connected between an output 50 of amplifier 40 and input 42. Output 50 is also connected through a resistor 52 to an inverting input 54 of a differential amplifier 56 having an input 58 connected to ground 24 and an output connected to an apparatus output 60. A feedback capacitive means 62 is connected between output 60 and input 54 of amplifier 56. A variable resistance 64 is connected between output 60 and input 28 of amplifier 30. A PNP transistor generally designated as 66 is connected in its inverted condition in parallel with capacitor 62 with its emitter connected to input 54 and its collector connected to output 60. A base of transistor 66 is connected to a positive power supply terminal 68 through a resistor 70. In some embodiments positive terminal 68 may be the same as positive terminal 16. A zener diode 72 is connected between a base of transistor 66 and ground 24.

Figure 2:
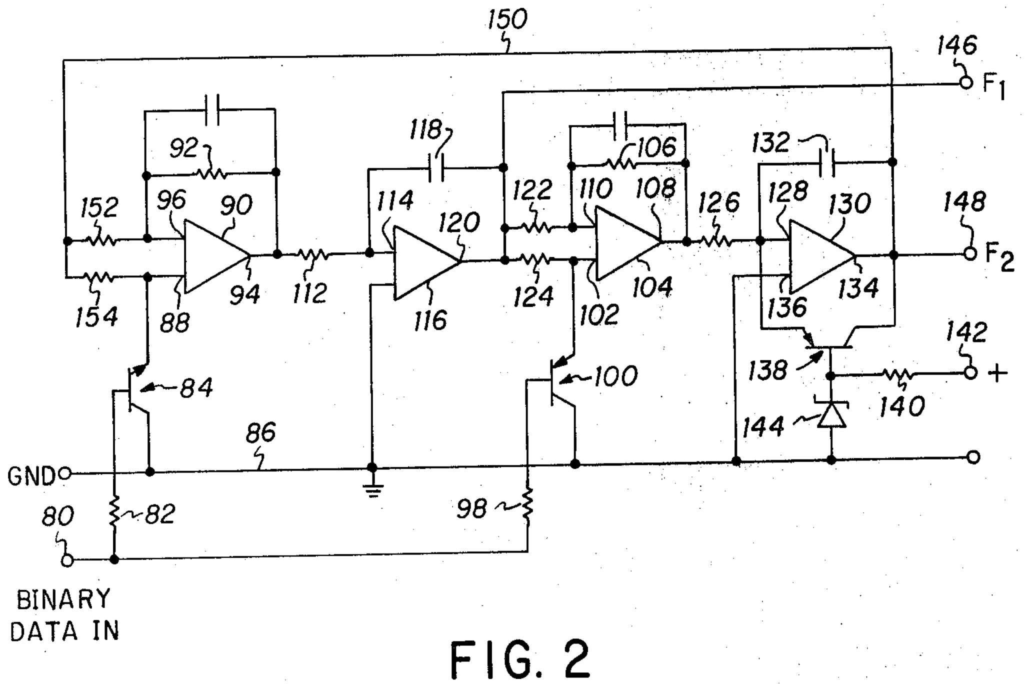

Referring now to FIG. 2, a data input terminal 80 is connected through a resistor 82 to a base of a NPN transistor 84. A collector of transistor 84 is connected to ground 86. The emitter of transistor 84 is connected to a positive or non-inverting input 88 of a differential amplifier generally designated as 90. A feedback resistor 92 is connected from an output 94 of amplifier 90 to an inverting input 96. Input 80 is also connected through a resistor 98 to a base of PNP transistor generally designated as 100. Transistor 100 has its collector connected to ground 86 and its emitter connected to a non-inverting or positive input 102 of a differential amplifier generally designated as 104. Amplifier 104 has a feedback resistor 106 connected from an output 108 to an inverting or negative input 110 thereof.

A resistor 112 connects the output 94 of amplifier 90 to a negative or inverting input 114 of differential amplifier 116. A feedback or integrating capacitor 118 is connected from an output 120 of amplifier 116 to input 114. The positive or non-inverting input of amplifier 116 is connected to ground 86. A resistor 122 is connected from output 120 to input 110 of amplifier 104. A resistor 124 is connected from output 120 of amplifier 116 to input 102 of amplifier 104. A resistor 126 is connected from output 108 of amplifier 104 to a inverting or negative input 128 of a differential amplifier 130. Amplifier 130 has a feedback or integrating capacitor 132 connected from an output 134 thereof to input 128. A non-inverting input 136 of amplifier 130 is connected to ground 86. A PNP transistor generally designated as 138 is connected across amplifier 130 such that its collector is connected to output 134 and its emitter is connected to input 128. The base of transistor 138 is connected through a resistor 140 to a positive power terminal 142. The base of transistor 138 is also connected through a zener diode 144 to ground 86. A first output 146 of the apparatus is connected to output 120 of amplifier 116 while a second output 148 if connected to output 134 of amplifier 130. The signals appearing at these two outputs 146 and 148 will be of opposite phase. A lead 150 is connected from output 134 of amplifier 130 through a resistor 152 to input 96 of amplifier 90. A resistor 154 connects line 150 to input 88 of amplifier 90.

Although power sources and power drains or sinks may be required for each of the amplifiers illustrated in FIGS. 1 and 2, these have not been shown as they are standard in the art and would only add unnecessary detail to the drawings.

OPERATION

Referring first to FIG. 1, it will be realized by those skilled in the art that an integrating circuit, such as that comprising the amplifier 40 in combination with the feedback capacitor 48, will provide approximately 90° of phase shift. However, this phase shift is not exactly 90° and will change slightly depending upon frequency of operation. Further, although differential amplifiers were used for each of the integrators and for the phase inverting circuit of the oscillator of FIG. 1, the use of a differential amplifier was merely for convenience and single input amplifiers of the inverting type would operate equally as well in most embodiments.

Further, the phase inverting circuit such as that comprising amplifier 30 in combination with a feedback resistance having a parallel capacitance such as 34 will provide approximately 180° phase shift but this phase shift will change slightly with frequency due to the change in capacitive reactance with frequency. Since the resistors 26 and 38 are in parallel with resistor 32 when transistor 14 is deactivated, these form part of the feedback loop and change the effective total impedance.

In accordance with the above remarks, it can be determined that if binary data is applied to terminal 10, it will switch the transistor 14 between OFF and ON conditions depending upon whether the input is a binary 1 or a binary 0 and upon each change in data the switch 14 will accordingly activate or deactivate the effect of resistors 26 and 38 and thereby change the frequency at which there will be unity gain around the oscillator circuit.

As with all practical oscillators, the amplitude will build up until a limit condition is reached. In order to control the limit point, the transistor 66 has been placed across the feedback network of the integrator incorporating amplifier 56. Although it appears that the transistor may be connected incorrectly, it was intentionally connected in its inverted condition to lower the effective beta. The transistor is not a part of the invention as other means of limiting including automatic gain control could be substituted for transistor 66. It is a part of this invention that the amplitude control takes place across the integrator and not in any other part of the loop since that would only cause a change in frequency and the level would build up until the integrator limited due to power supply voltages.

The oscillator of FIG. 2 operates in a manner very similar to that of FIG. 1 except that it has two phase reversing elements, only one of which is operative at a given time. It has been determined that a phase reversing amplifier such as 90 when connected as shown will operate with a positive gain of 1 if input 88 is not grounded. In actuality, the amplifier has a positive gain of 2 through input 88 and a negative gain of −1 due to the feedback resistor 92 acting in conjunction with the resistor 152. The total net result is a gain of +1. When the input 88 is grounded, the effect of the input supplied through resistor 154 is negated and the previously mentioned gain of −1 through input 96 becomes the total gain of the device. Since the two transistors 84 and 100 are of opposite polarity types and since the same input is applied to both of these transistors, only one transistor will be in an activated or ON condition at a given time. Therefore, one of the amplifiers 90 and 104 will be in a phase inverting or −1 gain condition while the other is in a non-phase inverting or +1 gain condition.

While operational, one of the amplifiers will operate as a phase inverter to provide the additional approximately 180° phase reversal to allow the oscillator to operate while the other is merely acting as an isolation device or as a connection point such as would be found in FIG. 1 between output 50 and the resistor 52. In other words, the amplifier having a gain of +1 is effectively not being used by the circuit. For the purpose of explanation, it may be assumed that the output at terminal 148 is the projection of a rotating vector on the Y-axis and the output at 146 is the projection along the X-axis. It may be further assumed that there is phase reversal through amplifier 90 and no phase reversal through amplifier 104. The phase vector at output 148 could be rotating counterclockwise and be at the positive 45 degree condition. This would mean capacitor 132 would be charging and output 148 would be rising in voltage with respect to ground. If at this instant the signal at input 80 is changed so that amplifier 104 is phase inverting and amplifier 90 is non-inverting, it may be determined that the voltage being applied to capacitor 132 to charge it will suddenly be inverted by amplifier 104 and commence its discharge back to zero. The effect on the phase vector is that it will start rotating clockwise. This circuit does not allow the discontinuities in output signal found in prior art circuits. It will not switch suddenly to −135° since the capacitor voltage cannot be altered suddenly.

The same type of explanation would be applicable if the input were taken from output 146. It should be noted that this output is in quadrature relation to that at 148 such that the two outputs represent Sin and Cos functions. Both of these outputs can be used in a single sideband modulator to produce the usual FSK signal centered around any desired reference frequency.

The advantages of this FSK generation scheme are that spectral band limiting can be accomplished using simple low pass filters and that the frequency tolerance of the oscillator is greatly relieved since only the frequency deviations (which are very small) are generated and the center frequency is determined by a fixed frequency crystal oscillator.

In summary, it may be determined that the present invention comprises an oscillator using two integrating circuits whose integrating capacitors charge and discharge to produce the Sine and Cos wave outputs and whose integrating circuits only provide part of the phase shift required to produce an oscillator. The remaining phase shift is provided by a differential amplifier connected in a feedback mode. In FIG. 1 this feedback amplifier has two conditions of operation for providing the necessary additional phase shift and loop gain change at each of two different frequencies. In FIG. 2, the remaining phase shift occurs in one of two separate amplifiers, only one of which is operating in an inverting mode at a given time. Thus, FIG. 2 provides a circuit for changing the direction of rotation of a phase vector in an oscillator without causing a voltage amplitude discontinuity in the output signal while FIG. 1 provides a means for abruptly changing the frequency of operation of an oscillator without causing a voltage amplitude discontinuity in the output signal.

Even though the circuit component values of the circuit will tend to be apparent to those skilled in the art, it may be helpful to have the formulas utilized to build the present invention as shown in FIG. 1. The value of resistor 44 equals that of resistor 52 and may be determined from the formula $1/(2\pi F_1C_{48})$. $C_{48}$ is equal to that of $C_{62}$. $F_1$ is the higher frequency of the oscillator while $F_2$ is the lower frequency. One embodiment of the invention used a capacitor of 2,400 pf for each of capacitors 48 and 62. A center frequency $F_c$ was chosen of 780 Hz. The resistor 44 or 52 chosen by this method became 82.5 kilo ohms. The resistor 26 equals the value of resistor 38 and may be determined by the formula $5/[(F_1/F_2)^2 - 1]$. Resistor 32 was 10,000 ohms and the variable resistance 64 varied between 9,000 ohms and 11,000 ohms while capacitor 34 was 100 picofarads.

In FIG. 2 the resistors 112 and 126 were determined by the same method as resistor 44 in FIG. 1 with the capacitors 118 and 132 being determined the same as capacitor 48 in FIG. 1. The remaining resistors were each 10,000 ohms.

I wish to be limited not by the specific embodiments illustrated and described in detail above, but only by the scope of the appended claims, wherein I claim:

1. Signal frequency generating apparatus for providing FSK outputs comprising, in combination:

first and second integrating means each including amplifiers connected between input means and output means thereof and having feedback capacitors across said amplifiers for providing a substantially 90° signal phase shift therethrough;

connection means for connecting the output means of said first integrating means to said input means of said second integrating means;

amplifier means for connecting said output means of said second integrating means to said input means of said first integrating means, said amplifier means including a capacitor connected in parallel with resistance means in feedback relationship for providing a signal phase reversal at a given frequency;

switch means connected to said resistance means and operating between first and second conditions in response to data inputs, said switch means altering the frequency at which unity gain occurs in said second connection means in changing from said first to said second condition; and apparatus input means for supplying binary data input signals to said switch means.

2. Apparatus as claimed in claim 1 wherein:

said resistance means comprises first and second parts and said switch means alters the frequency at which unity gain is achieved occurs by deactivating said first part.

3. Apparatus as claimed in claim 1 also including:

apparatus output means for providing FSK output signals, connected to the output means of the amplifier of said second integrating means, the feedback capacitor connected across the amplifier of said second integrating means preventing transitional spikes in the output signal obtained at said output means thereof upon alteration of the frequency in response to operation of the switch means from said first to said second condition.

* * * * *